(12) United States Patent
Pouillard

(10) Patent No.: US 6,685,238 B1
(45) Date of Patent: Feb. 3, 2004

(54) METHOD AND DEVICE FOR SEALED MECHANICAL CONNECTION

(76) Inventor: Daniel Pouillard, 7, rue Lavolaier, Noisy le Sec, F-93190 (FR)

( * ) Notice: Subject to any disclaimer, the term of this patent is extended or adjusted under 35 U.S.C. 154(b) by 59 days.

(21) Appl. No.: 10/089,489
(22) PCT Filed: Sep. 27, 2000
(86) PCT No.: PCT/FR00/02663
§ 371 (c)(1), (2), (4) Date: Mar. 28, 2002
(87) PCT Pub. No.: WO01/23797
PCT Pub. Date: Apr. 5, 2001

(30) Foreign Application Priority Data

Sep. 28, 1999 (FR) .............................. 99 12040

(51) Int. Cl.[7] ................................ F16L 21/02
(52) U.S. Cl. .................. 285/337; 285/374; 285/419; 285/420
(58) Field of Search ................. 285/337, 374, 285/420, 348, 351, 419

(56) References Cited

U.S. PATENT DOCUMENTS

| | | | | |
|---|---|---|---|---|
| 2,868,576 A | * | 1/1959 | Boughton | 277/620 |
| 2,969,995 A | * | 1/1961 | Boughton | 285/413 |
| 4,056,273 A | * | 11/1977 | Cassel | 285/337 |
| 4,170,375 A | * | 10/1979 | Ito | 285/348 |
| 4,466,642 A | | 8/1984 | Touchen | |
| 4,648,633 A | * | 3/1987 | Bergmann | 285/337 |
| 4,660,862 A | * | 4/1987 | Cassel et al. | 285/114 |
| 6,203,073 B1 | * | 3/2001 | Sato et al. | 285/337 |

FOREIGN PATENT DOCUMENTS

| | | | |
|---|---|---|---|
| DE | 3909060 A1 | 9/1990 | |
| EP | 0 756 120 A1 | 1/1997 | |
| FR | 2 694 063 A1 | 1/1994 | |
| JP | 4-231787 | * 8/1992 | 285/419 |
| WO | WO 90/14545 A1 | * 11/1990 | 285/337 |

* cited by examiner

Primary Examiner—Lynne H. Browne
Assistant Examiner—James M. Hewitt
(74) Attorney, Agent, or Firm—Oppedahl & Larson LLP

(57) ABSTRACT

A mechanical joint including a circular seal (4), a gland ring (5), an elastic ring (6) and a back-up ring (7), as well as a body (1), with closure and backing part (2), while the joint can further contain a counterseal as an option, the body can further contain the closure and backing part as an option, and the elastic ring (6) is optionally equipped with two symmetrical pitch union nuts (9, 10) and two gaskets (11, 12), as well as with a symmetrical pitch screw (13). The joint has application to all pipe couplings, with alignment stress or with misalignment tolerance.

18 Claims, 12 Drawing Sheets

METHOD AND DEVICE FOR SEALED MECHANICAL CONNECTION

BACKGROUND OF THE INVENTION

The present invention concerns mechanical couplings and, in particular, tight and rigid mechanical couplings intended to join the ends of all-purpose pipes.

There are numerous methods of tight mechanical coupling aimed at making possible the paired junction of the ends of successive lengths of pipe belonging to a same pipeline. As is standard, in such a junction of two pipe ends, it is common for at least one of those ends to remain smooth or to undergo just a simple preparatory treatment, such as, for example, cold stress, turning or the like.

Such techniques are applicable to the fabrication of tubular members and fittings (sleeves, elbows, tee-pieces, reducers, crosses, etc.) or for making various sectioning, adjusting, control or fluid moving mechanisms, like, for example, valves, caps, pumps and others. They make it possible to introduce the smooth or shaped joint of one of the lengths of pipe into the tubular mechanical joint of the other length, while the junction operation is then limited to the tightening of nuts, screws and/or bolts in order to secure a tight and rigid connection between said lengths. Thus, for example, the laying of pipe is facilitated compared to the case in which those lengths of pipe are joined by welding or by screw or flange couplings.

Most of the techniques of the prior art of tight mechanical coupling have been around for a long time and a large number of them are used primarily in the field of small-diameter pipes, that is, those in which the upper limit can be conventionally fixed at an inner diameter of approximately 40 mm. For pipes having a greater diameter, in which butt weld or flanged joints are generally preferred, those techniques have been much less widespread. When they have been used, they have been divided into three main types, each with their own disadvantages and the use of which is, in practice, limited to certain categories of pipe systems or for repairs, by reason of their costs or their conditions of use.

These three main types of coupling techniques are:

Technique 1: Coupling Using the Gland Principle

The smooth tubular joint is in this case considered the part serving as axis, and the mechanical joint Which receives it is fabricated as a gland. The "packing" then often boils down to a simple O-ring seal, frequently made of elastomer. A split elastic ring is inserted between a washer, which serves to equalize the compression on the seal, and the forcing nut, so that this ring is wedged on the smooth tubular joint and the connection of the two joints is thus obtained, at the same time as the required tightness. Beyond a certain limit in the diameter of the pipe to be connected, that is, approximately 60 mm in practice, the nut is to be replaced by a flange. Some of the difficulties of a flange coupling are thus repeated in a technique which per se is not the most economical one. It follows that in the range of diameters greater than the said value, namely, approximately 60 mm, the coupling technique according to the gland principle is used when the other methods, such as butt welding of the pipe ends or welded flange connection, are ill advised or more difficult to employ or even more expensive. This situation is peculiar, that is, rather uncommon, when the pipes have a diameter greater than approximately 60 mm.

Technique 2: Joint with circular groove

Each pipe joint to be connected bears a circular groove, which can "come" from casting if the joint forms part of a piece made by casting, or which can be obtained by machining or by cold stress. The two pipe ends to be joined are connected to each other by a tight collar made of elastomer, which is then covered in turn by two half-shells that fit into the aforesaid tubular grooves at the same time as they fit into each other. Finally, the half-shells are joined by bolts to secure the mechanical connection of the assembly and to keep the collar in position.

This technique is economical in the case of pipes with repetitive elements, like, for example, those of sprinkler systems. It loses a part of that advantage when the pipes are "made to order," which is often the case on building sites or industrial sites. Furthermore, it suffers from another considerable disadvantage: except in the case of sleeves or reducers, it is impossible to fabricate a fitting (for example, an elbow, tee-piece, cross, etc.) or a mechanism (for example, a valve, a pump, etc.) in a single assembly to be mounted between tubular ends. It is necessary to attach to that fitting or mechanism as many sleeves as there are ends to be connected.

Technique 3: Split sleeve coupling

The sleeve assembly functions as a single split elastic ring that is tightened by two cross screws and in which an elastomer collar is arranged, the inner diameter of which diminishes or increases depending upon whether said screws are tightened or loosened. Before tightening, a smooth tubular joint is introduced at each end of the sleeve and then the screws are tightened, which determines the tightness of the mechanical connection. It is possible to improve the latter from the standpoint of resistance to the longitudinal stresses produced by circulation of the fluid, by equipping the sleeve with two gripping parts.

The split sleeve technique improves the ease of laying pipe as well as flexibility of use, regardless of the diameter of pipe to be connected. The fabrication of sleeves is, however, relatively expensive. Furthermore, the resulting cost of laying pipe is increased even more by the fact that, as in technique 1 mentioned above, only the sleeves can exist as a complete assembly making it possible to connect two smooth joints. As for the other fittings (elbows, tee-pieces, etc.) and elements such as cocks and valves, those fittings or elements should be made with smooth tubular ends and it is necessary for as many sleeves to be added to them as there are smooth ends to be connected to the smooth joints of the pipe.

More concretely, the prior art can be illustrated by the following documents:

Patent application FR 2,694,063 describes a tight mechanical coupling using one mating flange for compression of the seal and a second mating flange for the respective attachment of the tubular joints to be assembled.

In the pre-examination publication of patent application DE 3,908,060 a pipe connection device is described with two hollow half-shells, tightened by two bolts and acting on two intermediate elastic members in order to result in attachment of the assembly. In the device thus described tightness can be achieved only if the material of the articulation part permits or if a joint filler is added, which entails, in practice, bonding of the junction.

U.S. Pat. No. 4,466,642 describes a pipe fitting system with screwing acting on a casing outside the fitting, which is split over its entire length, by means of two reinforcing bars that have the effect of generating and maintaining plastic deformations.

Patent application EP 0,756,120 describes a system for pipe coupling by straight sleeves. The straight sleeve body used is split over its entire length, is tightened from outside and activates a seal by radial compression, as well as intermediate gripping rings necessary for attachment.

A need therefore existed for tight mechanical couplings that are economical and polyvalent for connections between a smooth tubular joint and a mechanical joint belonging to another pipe end for a wide variety of areas of application.

SUMMARY OF THE INVENTION

The object of the present invention is to provide a specific method for overcoming those disadvantages and combining the advantages of the three types of techniques mentioned above.

That objective has come to be achieved, together with others which will emerge in the course of this description, thanks to a device employing a pipe fitting operation and necessitating the tightening of only one screw.

The device according to the invention comprises, in its basic structure, a mechanical joint containing a circular seal, a gland ring, an elastic ring, a back-up ring and a body, while said mechanical joint can further optionally contain a counterseal and said body can further optionally contain a closure and backing part.

BRIEF DESCRIPTION OF THE DRAWINGS

The different embodiments of this object as well as the other objects according to this invention will be best described below with reference to the attached drawings, in which.

DETAILED DESCRIPTION OF THE INVENTION

The nomenclature of the parts represented in these figures is as follows:

| | |
|---|---|
| 1: | body |
| 2: | closure and backing part |
| 3: | counterseal |
| 4: | seal |
| 5: | gland |
| 6: | elastic ring |
| 7: | back-up ring |
| 8: | counter-ring |
| 9 and 10: | nuts, with symmetrical pitch as an option |
| 11 and 12: | gaskets |
| 13: | screws, with symmetrical pitch as an option |
| 14: | seal |
| 15: | casing |

Figure 1:
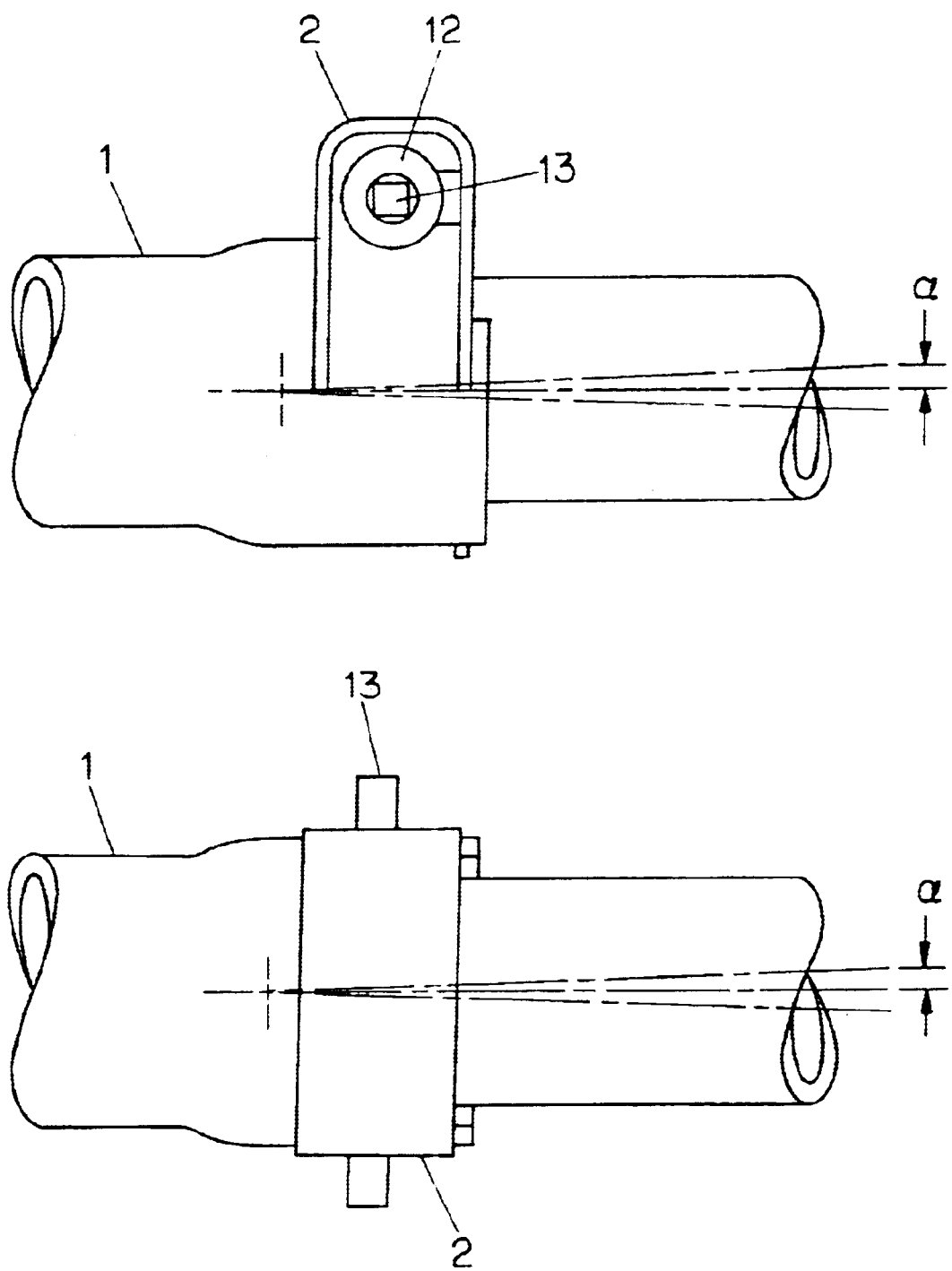
FIG. 1 represents, in side view and in top view, a junction according to the invention of two pipe ends, one of which is smooth, while the other consists of a mechanical joint.

In all cases, the tight coupling device according to this invention is a device making it possible to obtain a tight mechanical connection between a smooth tubular joint in the position of a male part and a mechanical joint in the position of a female part by tightening of a single screw and after a simple fitting operation (see FIG. 1). The junction thus formed, which is rigid, can be made with an alignment stress or, as a variant, with an angular tolerance of misalignment of the two joints.

In one of its embodiments, which is referred to here as "basic embodiment," represented in FIG. 7, the device according to the invention contains a circular counterseal 3, a circular seal 4, a gland ring 5, an elastic ring 6 and a back-up ring 7, as well as a body 1, with closure and backing part 2. The elastic ring 6 is in turn equipped with two symmetrical pitch union nuts 9 and 10 and two gaskets 11 and 12, as well as with a symmetrical pitch screw 13.

Figure 13:
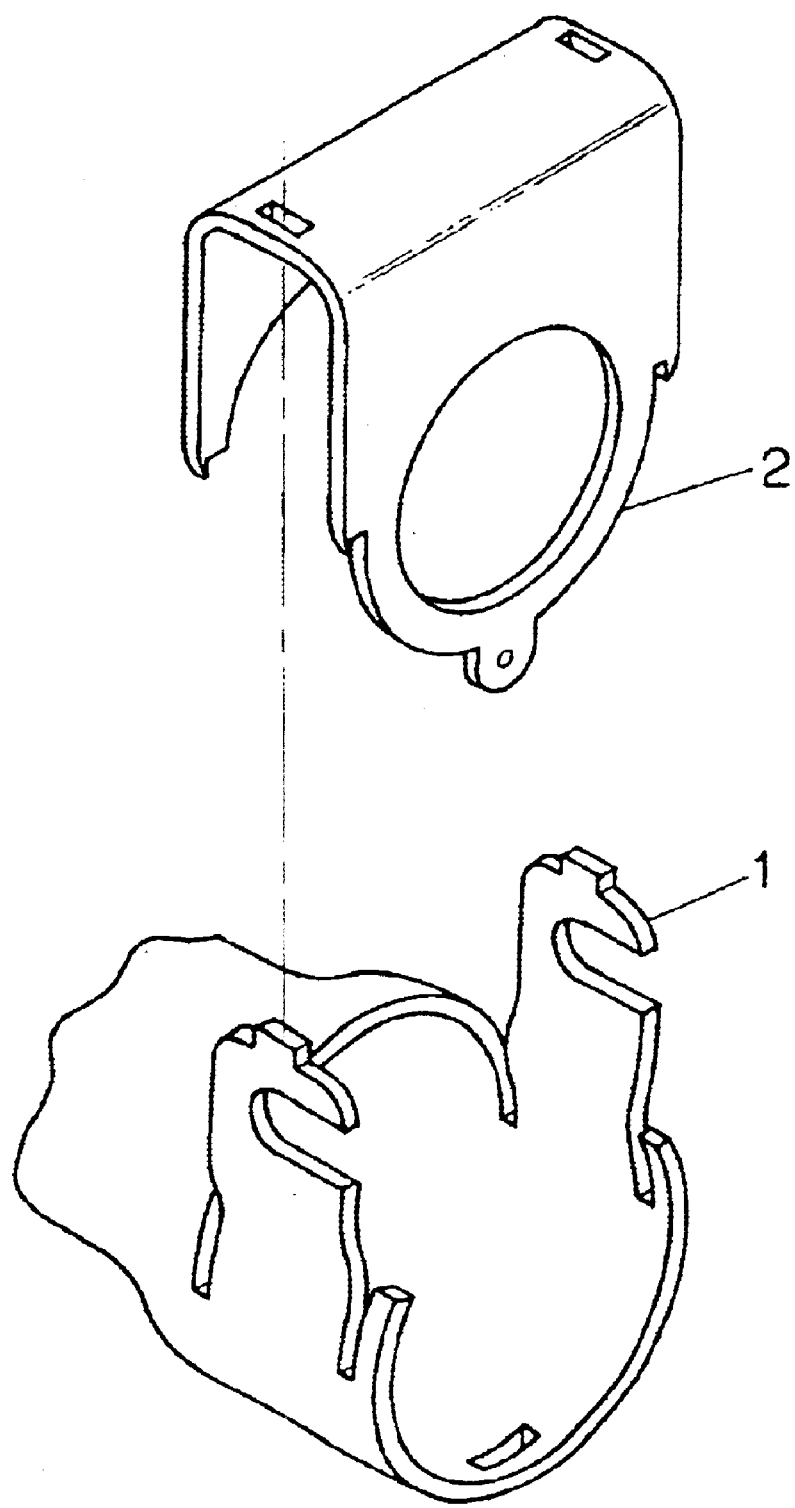
FIG. 13 represents in plan view with partial schematic section an advantageous embodiment of a device according to the invention, in which the body and the closure and backing part of the device favor assembly of the parts of the mechanical joint.

An advantageous embodiment of the body 1 and of the closure and backing part 2 is represented in cavalier projection in FIG. 13.

Figure 2:
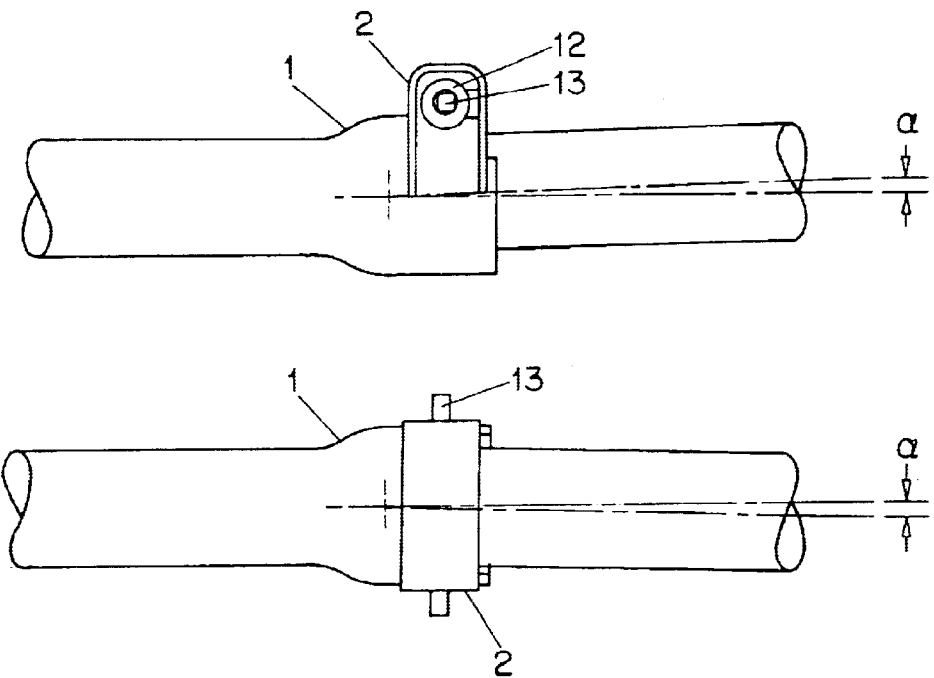
FIG. 2 represents, in side view and in top view, an embodiment of the coupling device according to the invention, applied to the fabrication of pipes and to their coupling.
Figure 3:
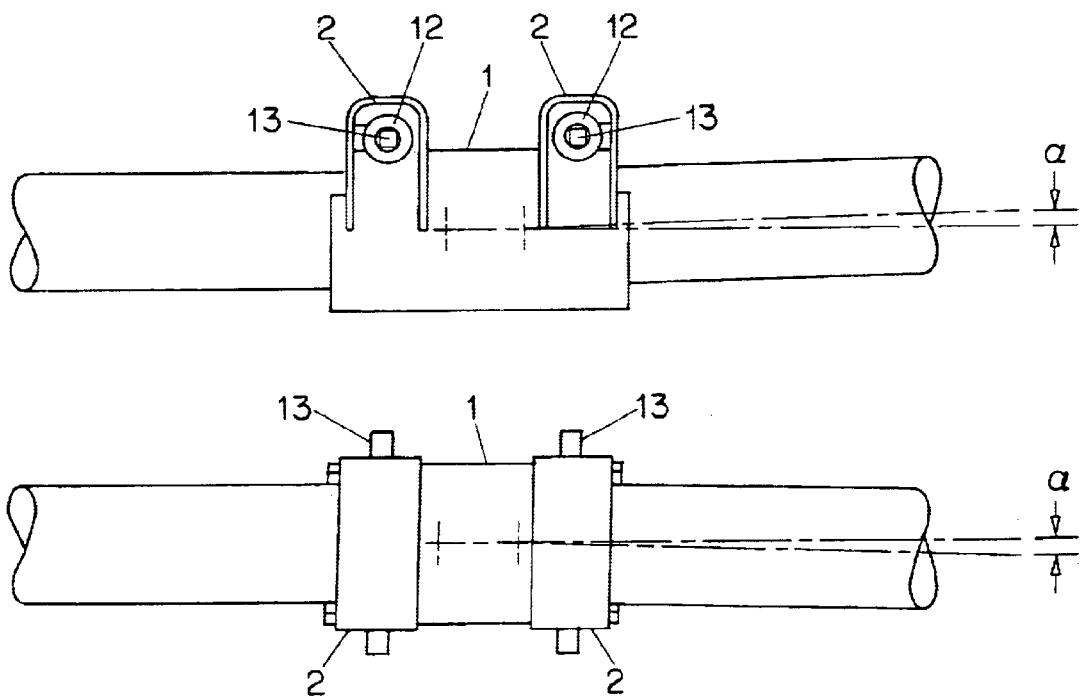
FIG. 3 represents, in side view and in top view, an embodiment of the coupling device according to the invention, applied to the fabrication of sleeves.
Figure 4:
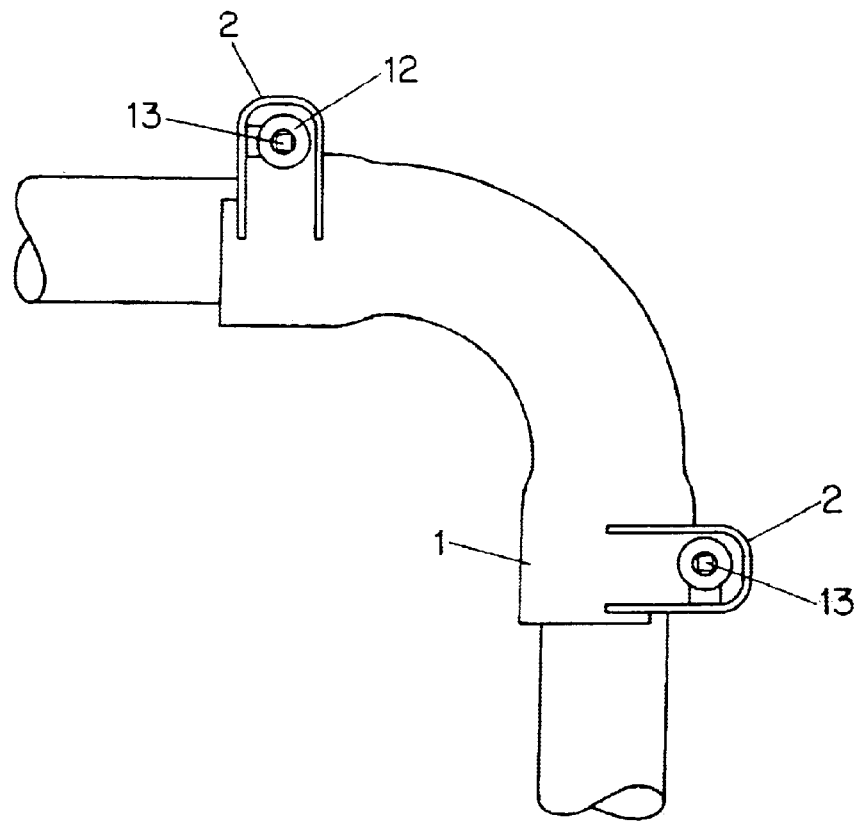
FIG. 4 represents, in side view and in top view, an embodiment of the coupling device according to the invention, applied to the fabrication of elbows.
Figure 5:
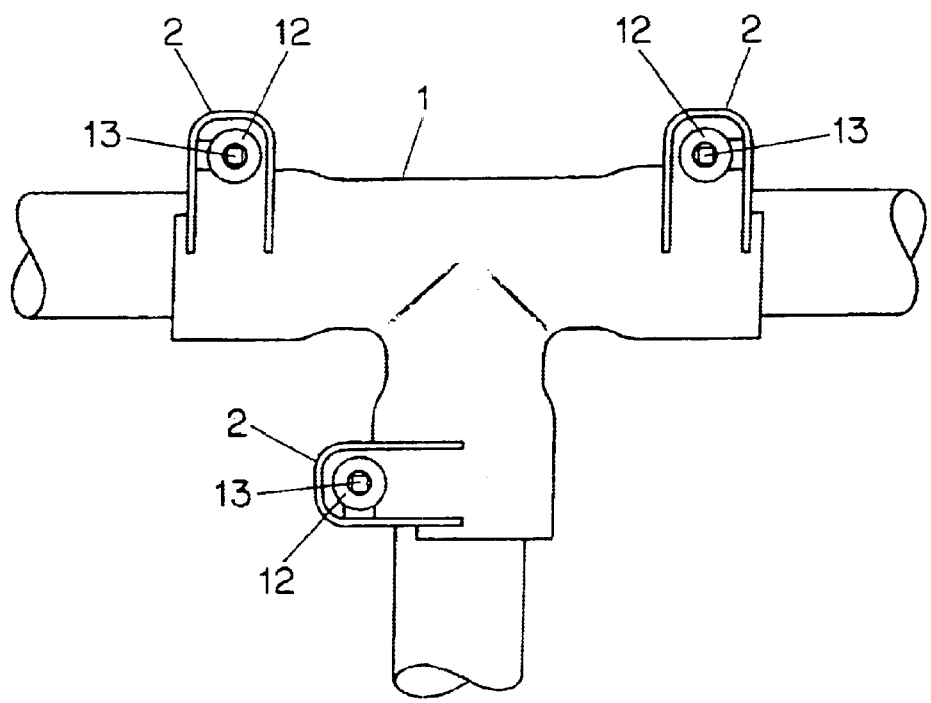
FIG. 5 represents, in side view and in top view, an embodiment of the coupling device according to the invention, applied to the fabrication of tee-pieces.
Figure 6:
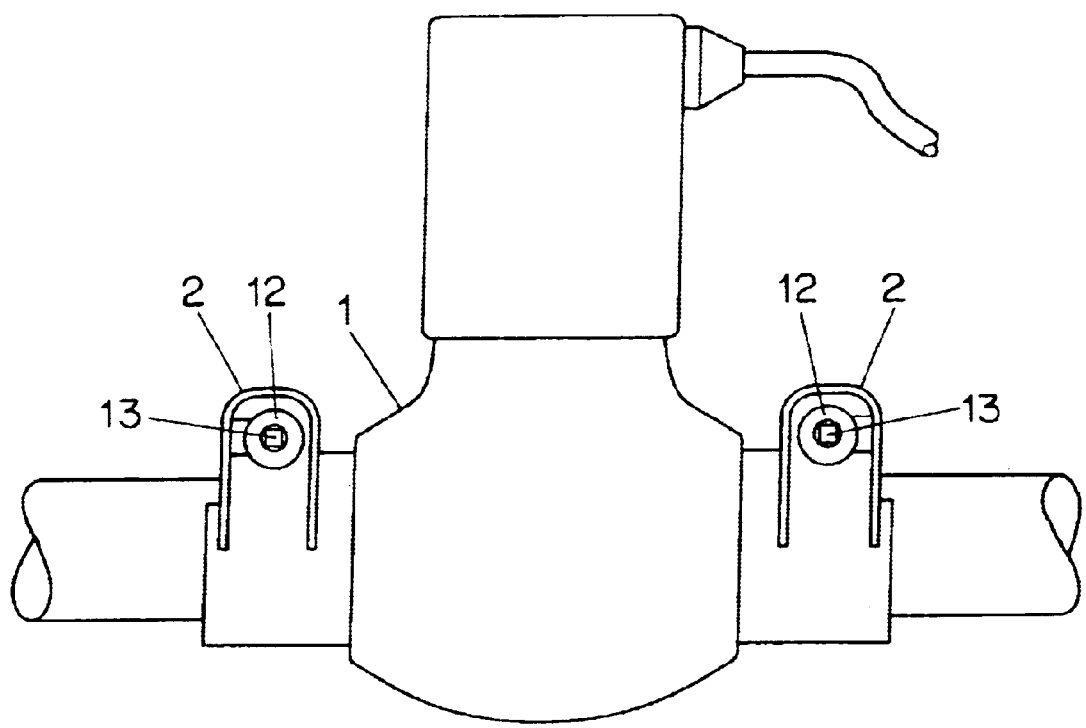
FIG. 6 represents, in side view and in top view, an embodiment of the coupling device according to the invention, applied to the fabrication of valves.

The mechanical joint according to the invention can belong to the end of a pipe (FIG. 2), but, as a variant, it can be integrated with a sleeve containing two symmetrical mechanical joints (FIG. 3), with an elbow (FIG. 4), with a tee-piece (FIG. 5), with a cross, with a reducer, etc. It can also, according to other variants of its different embodiments, form integral part, as coupling device, of a sectioning, control, circulation or fluid treatment mechanism, such as a valve (FIG. 6), a cap, a pump, a filter, etc., and said parts or said mechanisms can then be coupled simply and rapidly to portions of pipe at smooth tubular ends, by means of such a device according to the invention, adapted to the individual case considered.

Figure 7A:
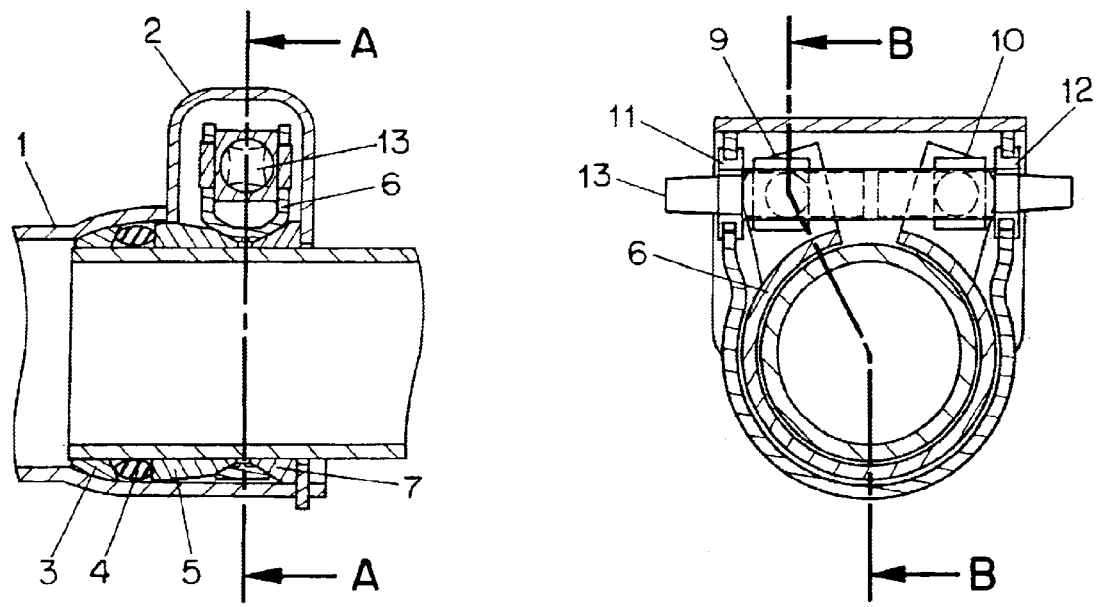
FIGS. 7a and 7b is constitute analytical presentations of the basic technique according to the invention for a straight alignment of two joints (device before and after tightening of the screw respectively) in the form of cross sections respectively along lines B—B and A—A of a device according to the invention.
Figure 7B:
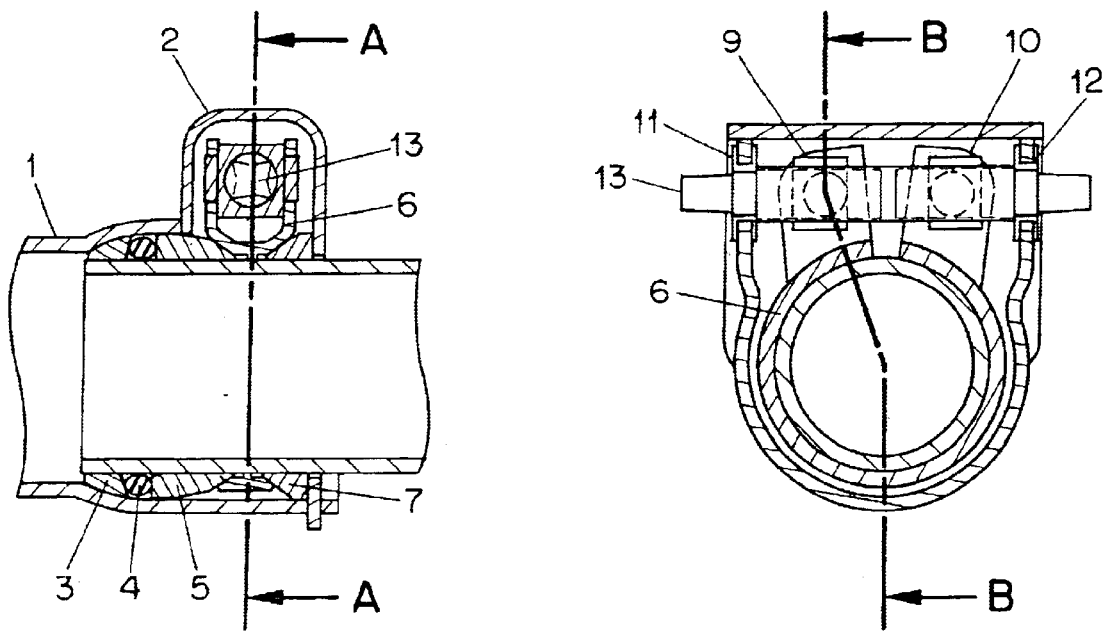

To ensure the operation of such a device or of a similar device, the elastic ring 6 is initially maintained in open position by the action of the symmetrical pitch screw 13 (see FIG. 7a representing the device before tightening), so that the insertion of the smooth tubular joint in the mechanical joint is rendered easy, that insertion being also facilitated by design, as well as by the optimization of tolerances and clearances. The tubular joint must be completely engaged in the counterseal 3. Then the two joints are maintain ed in relative stationary position, while the screw 13 is worked, for example, with a wrench which is fitted to either of its ends. The tightening of the elastic ring 6, which is done by pressing on the back-up ring 7, determines the lateral motion under stress of the gland 5 and thus the compression of the gasket 4, until tightness is secured. The elastic ring 6 then comes to the end of its tightening and is gripped on the smooth joint, which generates the mechanical connection of the two joints (see FIG. 7b, which represents the same device as that of FIG. 7a after tightening).

The invention thus also concerns a method of tight mechanical coupling between a mechanical joint forming part of a pipe end and a smooth tubular joint, which is made tight by compressing a seal 4 by means of tightening an elastic ring 6 activating a gland 5 by pressing on a mechanical joint body 1 via a ring 7 and closure and backing part 2, while the respective attachment of the two joints is made by the same tightening of said elastic ring 6, which is then directly gripped on the outer surface of said smooth tubular joint, the said tightening being accomplished by means of a single screw 13.

According to a variant of that method, a gland 3, 4, 5 type tightening technique and the technique employing elastic ring 6 for compression of a gasket 4 and for attachment of the mechanical joints to be assembled are integrated with said method, while those two techniques are rendered compatible by means of a self-centering of the elastic ring 6 on the gland 5, in practice by a conical interface, and on the mechanical joint itself. It was found that this self-centering was not disturbed by the other necessary connections of the ring 6 on the body 1 of the mechanical joint, those connections being made by means of parts 2, 7, 9, 10, 11, 12, 13.

In that method, the interface of part 7 with part 2, on one side, and the interface of part 15 with part 2, on the other, do not occasion any problem.

Figure 8A:
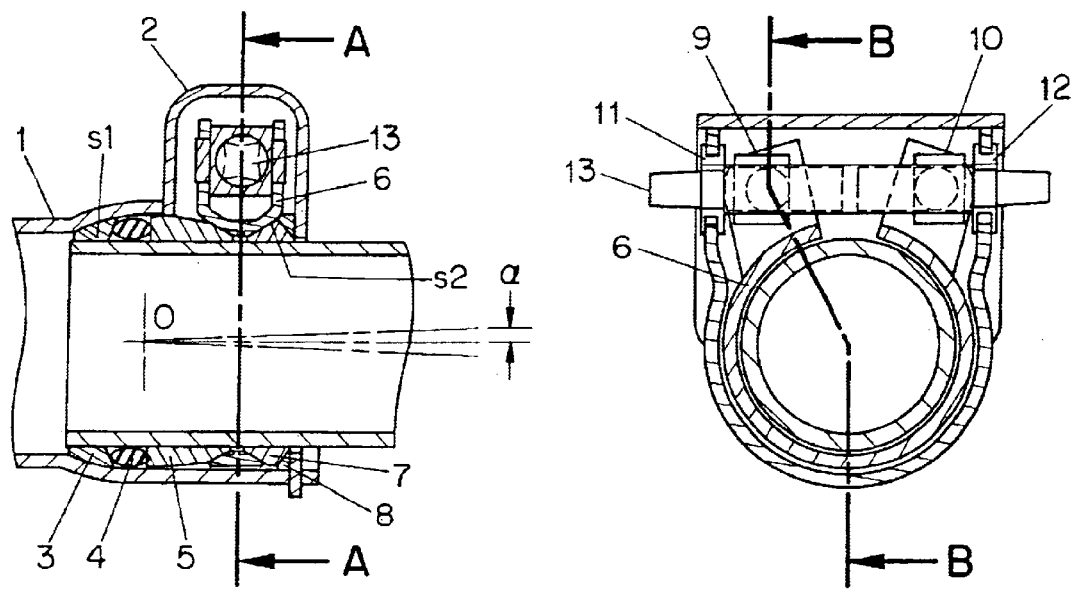
FIGS. 8a and 8b is constitute analytical presentations of the method according to the invention applied in a case of misalignment of two joints (device before and after tightening of the screw respectively) in the form of cross sections respectively along lines B—B and A—A of a device according to the invention.
Figure 8B:
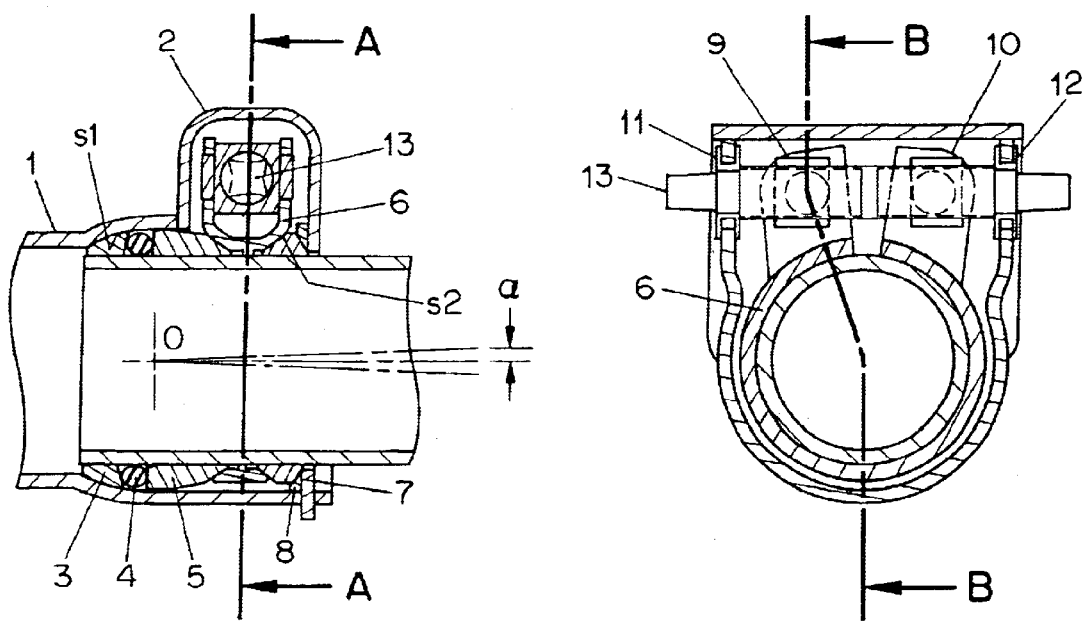

Variants of the device and method according to the invention, which constitute improvements, were also worked out. Thus, a possibility exists of obtaining an angular misalignment contained within an angle of tolerance α through an adaptation of the device according to the invention (see FIGS. 8a and 8b) by inserting there, between the ring 7 and the closure and backing part 2, a counter-ring 8, which is in contact with the ring 7 following the spherical surface s2 of center O. Furthermore, the counterseal 3 is in contact with the body 1 along the spherical surface s1, which also has point O as center. In that way, the parts 3, 4, 5, 6, 7, forming an assembly which is self-aligned on the smooth tubular joint, can remain integrated with the latter in a spherical connection of center O between the smooth tubular joint and the mechanical joint. The angular tolerance of misalignment α is, under those conditions, limited by design (width of the spherical surfaces s1 and s2, space for the elastic ring 6 in the closure and backing part 2, etc.).

Figure 9:
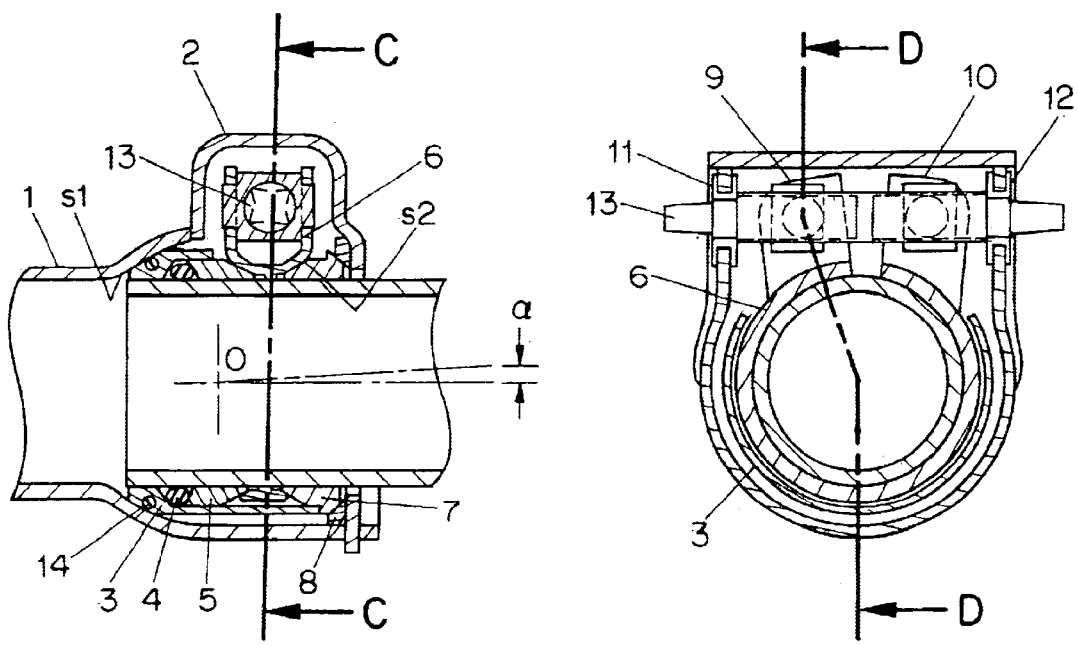
FIG. 9 represents a device according to the invention after tightening of the screw, in the form of cross sections respectively along lines D—D and C—C.

Another variant makes it possible to increase the possibility of misalignment, that is, the angle of tolerance α, through the enlargement of spherical surfaces s1 and s2 (see FIG. 9, representing the device in its tightening stage). According to that variant, complementing the device described above, on the one hand, a seal 14 is introduced, integrated with the counterseal 3, so as to preserve tightness and, on the other, the counterseal is extended in the form of a notched tube in order to serve as a guide for parts 4, 5, 6, 7, which makes it possible to maintain the proper operation of the elastic ring 6, in spite of the increase of angle α.

Figure 10:
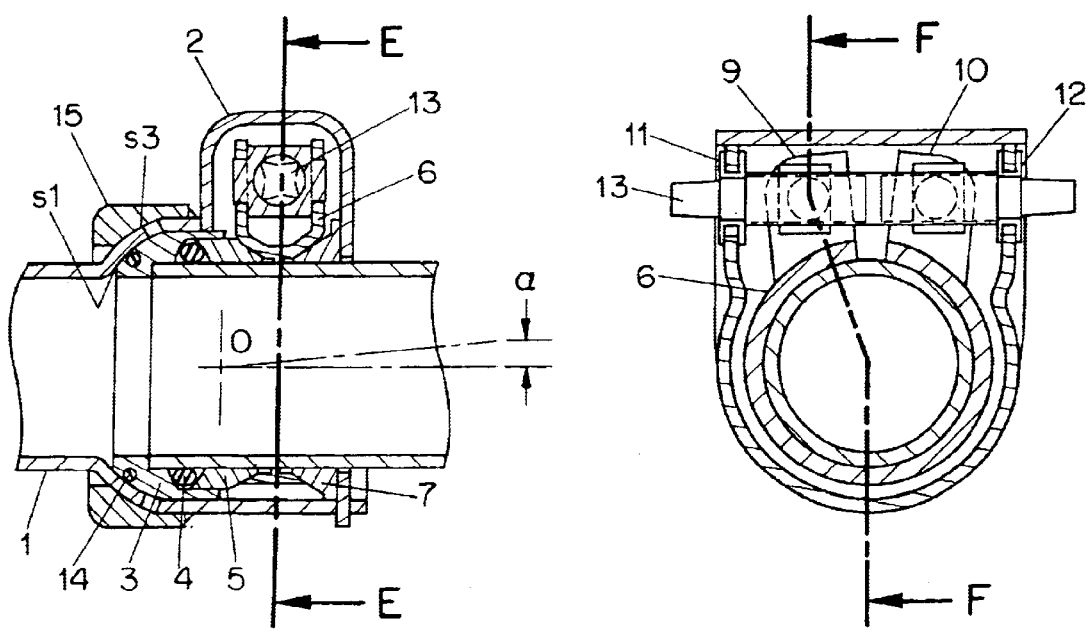
FIG. 10 represents a device according to the invention after tightening of the screw, in the form of cross sections respectively along lines F—F and E—E, with a possibility of maximized misalignment.

According to still another variant, intended to make possible an even greater tolerance of misalignment a (see FIG. 10), what constitutes the mechanical joint body according to FIG. 9 is divided into two separate parts. The first of those two parts, for which the body reference as well as the number 1 are retained, corresponds to a spherical tulip shape of the tubular end bearing the mechanical joint. The second of those two parts, which is the casing 15, is represented in the drawings in weldment, but it can be made in any other way. Parts 1 and 15 are connected by the spherical surface s3, which has the same center O as the spherical surface s1 through which parts 1 and 3 are joined. According to that arrangement, the mechanical joint, which consists of parts 2, 3, 4, 5, 6, 7, 8, 9, 10, 11, 12, 13, 14 and 15, can have a freedom of rotation around the center O, while in the embodiment according to the previous variant (represented in FIG. 9), the closure and backing part 2 and, a fortiori, the body 1 did not have that freedom. In that case, the tolerance of misalignment α is no more limited than by the width of the spherical surfaces s1 and s3 of center O, a width which can be increased by itself as well as by the increase of spherical radius of s1 and s3. The tolerance ox can thus be maximized.

Figure 11A:
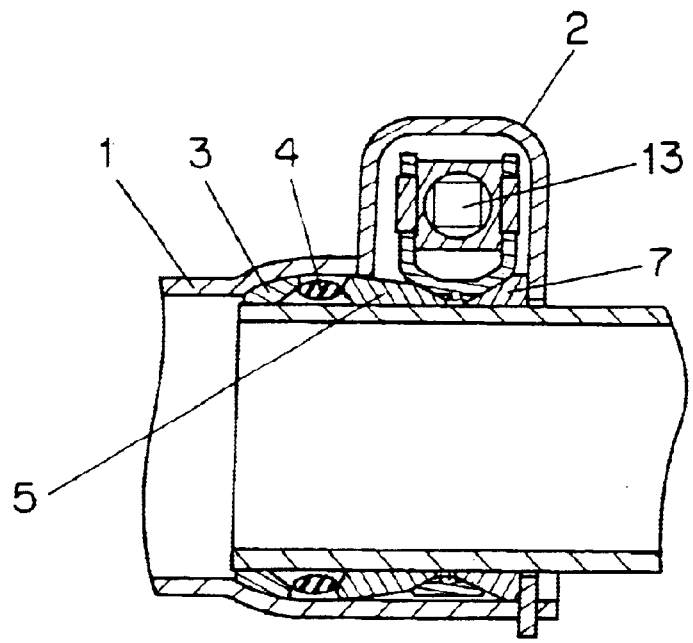
FIGS. 11a and 11b represent in longitudinal cross section a device according to the invention, in its basic version, with a lip seal tightness, before and after tightening of the screw respectively.
Figure 11B:
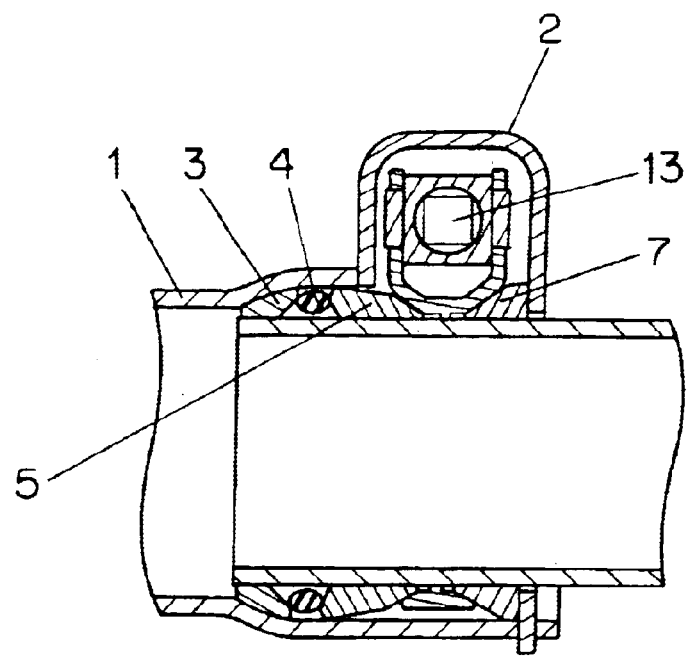

Still another variant of the device according to the invention is represented in FIGS. 11a and 11b. That variant also allows for other seal techniques, by elasticity or by plastic flow, in elastomer materials, plastomers, composites or graphite, among others. According to that other variant, the device employs an axial connection of the smooth tubular joint in the mechanical joint.

That required axial junction according to the variant represented in FIGS. 11a and 11b can be suitable in the majority of applications. However, in some applications, such as cocks and valves, fluid control and circulation, particularly in case the maintenance operations on the mechanisms involved have to be very rapid, a coupling of the mechanism with the connected tubular joints would be an additional advantage. Such a solution is proposed in the variant corresponding to the device according to FIGS. 12a and 12b. The device according to that variant represents a solution demonstrating the compatibility of the device with a radial connection.

Figure 12A:
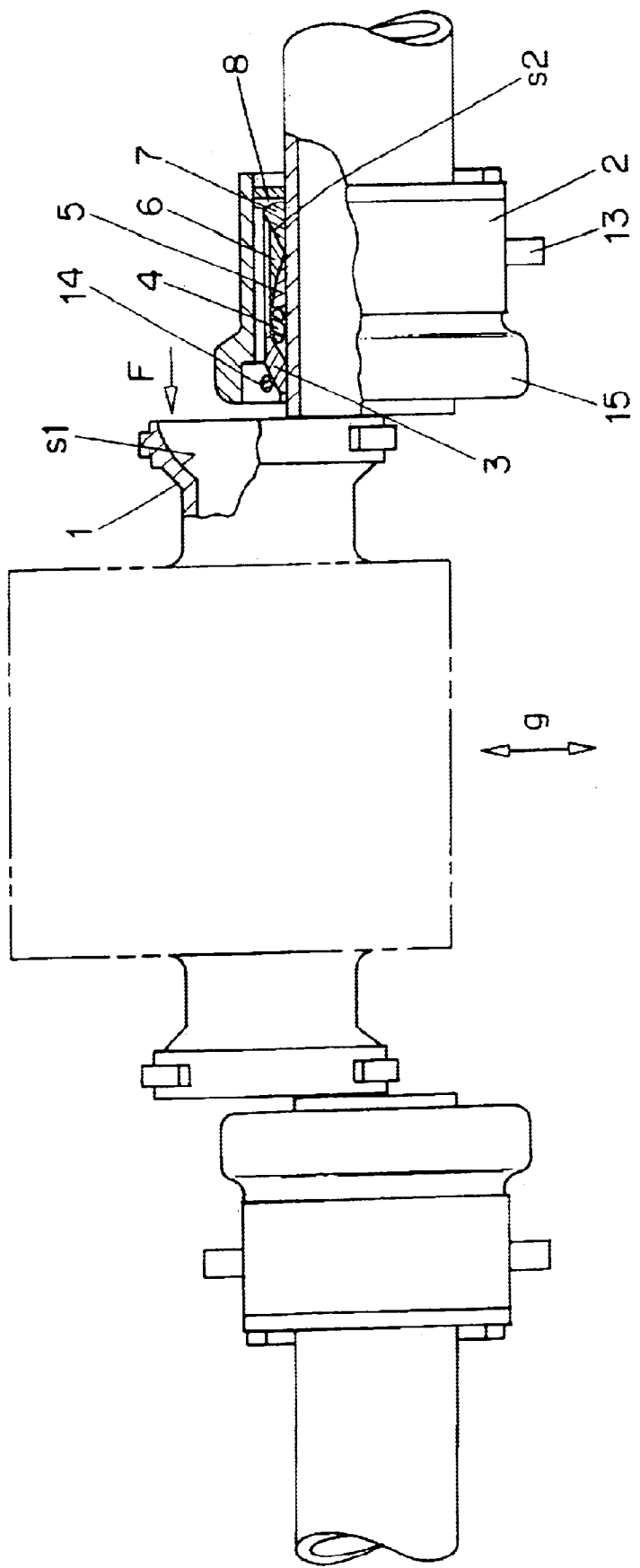
FIGS. 12a and 12b is represent, in front view and in partial schematic section, a device according to the invention rendered compatible with a transverse assembly in the case of its application to a mechanism, the device being shown in front view during and after assembly.
Figure 12B:
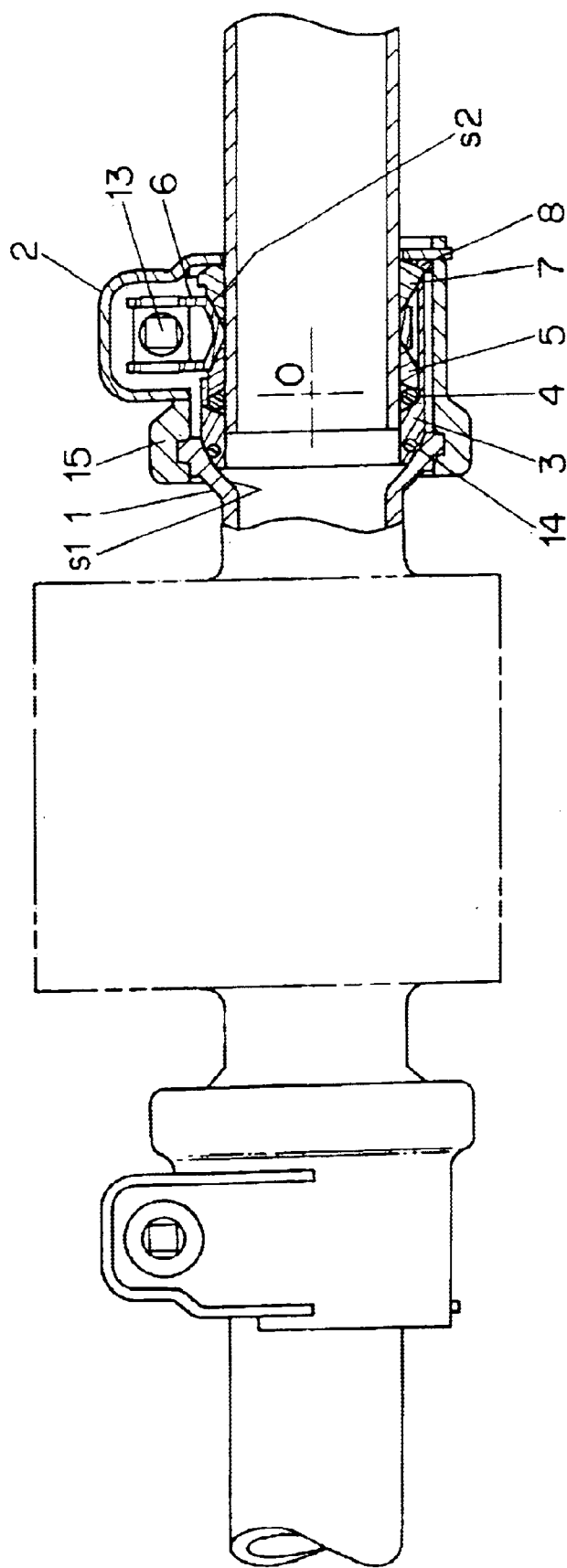

FIGS. 12a and 12b each represent a plan view with partial sections of an application of a device according to the invention to a specialized mechanism, depicted by a rectangle drawn in dots and dashes. FIG. 12a clarifies the position of the device at the beginning of the radial connection operation (following arrow g), while FIG. 12b represents that same device after radial connection. What was a joint body, as represented in FIGS. 7 to 9, is then, according to that variant, split into two detachable parts: the first is the body 1 belonging to the aforesaid mechanism, while the second is the casing 15 ensuring the connection and removable casing functions for parts 2, 3, 4, 5, 6, 7, 8, 9, 10, 11, 12, 13, 14, which comprise the mechanical joint and are joined to each other or with the casing 15. In order to obtain the capacity for radial connection or disconnection, another condition must further be met, namely, the smooth joint must not have any longitudinal engagement in the body 1. For that purpose, the counterseal 3 is extended in the direction of the body 1 (see FIG. 12*b*). On the connection of said mechanism (FIG. 12*a*), the tubular smooth ends have been previous set in position. Each mechanical joint casing 15 bearing parts 2, 3, 4, 5, 6, 7, 8, 9, 10, 11, 12, 13, 14 has then been slid over each corresponding smooth joint. Then, the mechanism to be connected has been precisely placed opposite the smooth joint with a transverse displacement in direction g. Finally, each mechanical joint casing has been attached with its parts on the corresponding body 1, advantageously integrating a notched flange (see FIG. 12*a* and its annex F of 1) through a double translation and rotation motion. The final attachment by a screw 13 has been made just as previously. On disconnection, the operations are carried out in reverse order.

Figure 14:
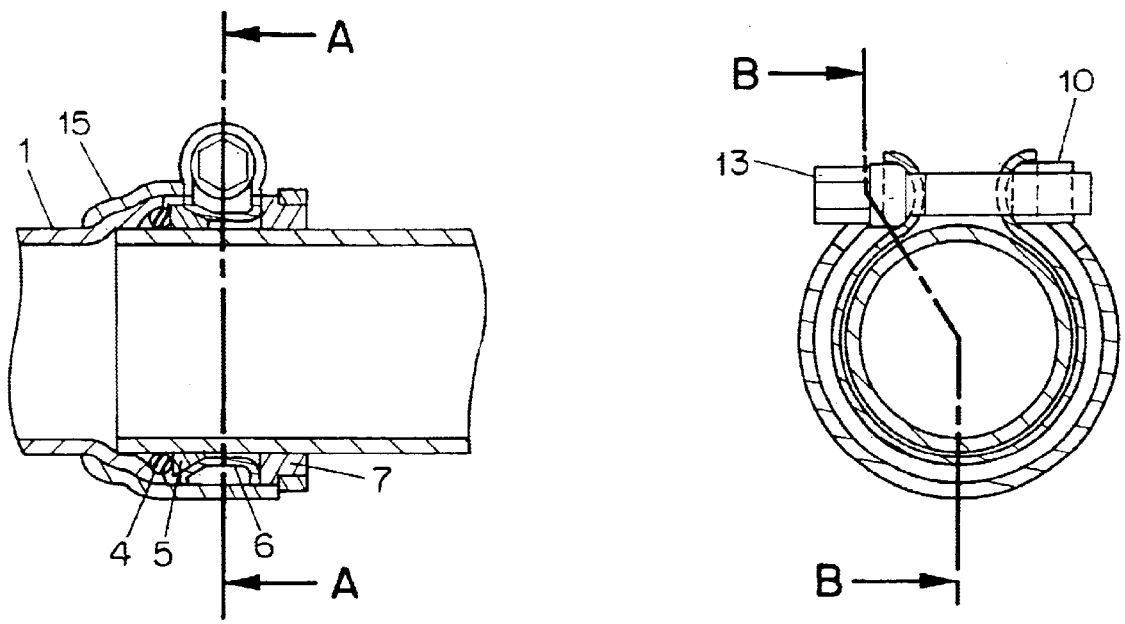
FIG. 14 represents, in side view and in top view, a working variant of the coupling device according to the invention, applied to fittings for the building industry.

In its embodiment represented in FIG. 14, the device according to the invention comprises:

a body 1, which is a corolla-shaped flared tubular joint, a casing 15, notched to admit an elastic ring, a seal 4 functioning by elasticity and by plastic flow, a gland ring 5 for compression of the seal, an elastic ring 6, equipped with a screw 13 and a nut 10, for tightening, while the screw 13 and the nut 10 have a spherical bearing, a back-up ring 7 integral with the casing 15.

The body 1 and the casing 15 can, if desired, constitute one and the same part.

The device according to this variant is represented in FIG. 14 before tightening, just after introduction of the smooth tubular joint.

To put such a device into service, the screw 13 is worked, which has the effect of tightening the elastic ring 6. In that movement, the elastic ring 6 presses on the back-up ring 7, which is mechanically integrated with the casing 15, fastened in turn on the body 1. Said elastic ring 6 can thus drive back the gland ring 5 over the conical surface separating those two parts. In that way, the seal 4 is compressed in order to obtain tightness and, at the same time, the elastic ring 6 is directly tightened on the smooth tubular joint, thus securing the mechanical connection.

The embodiment of the device according to the invention represented in FIG. 14 can be suitable, notably and not limitatively, for industrial applications, in particular for fittings for the building industry on copper, stainless steel or plastic plumbing fixtures or on heating and air conditioning ducts, usually made of steel.

Figure 15:
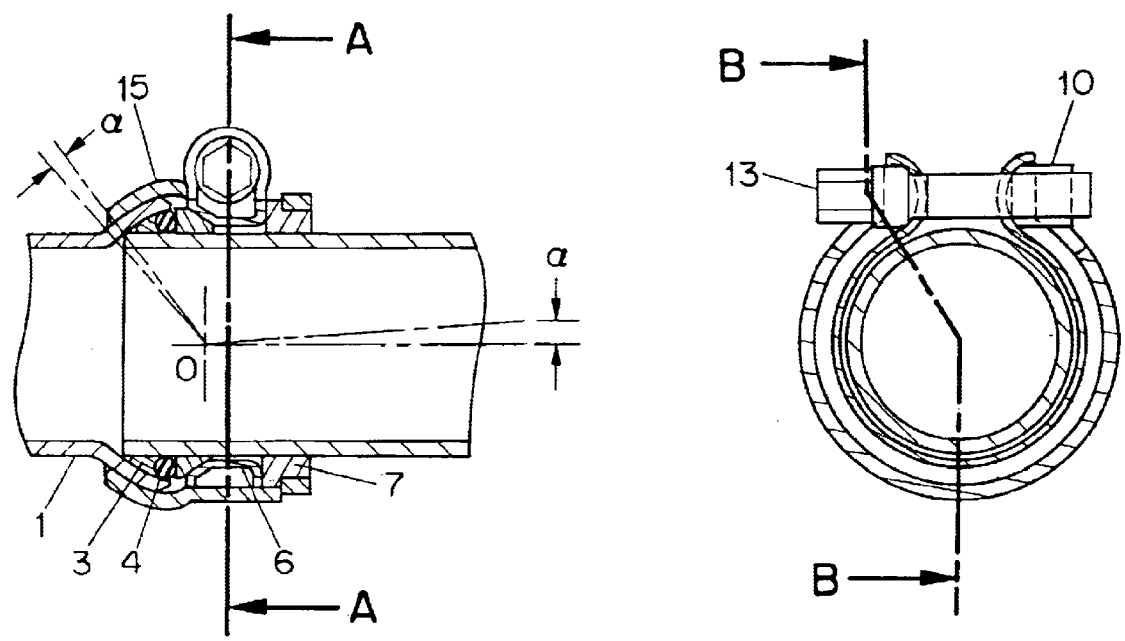
FIG. 15 represents, in side view and in top view, another variant embodiment of the coupling device according to the invention, intended for different applications.

In still another working variant of the device according to the invention, represented in FIG. 15, which stems from the variant according to FIG. 14 and which also uses the compression seal technique accompanied by use of an elastic ring, the device comprises:

a body 1, which is a sphere-shaped flared tubular joint, a casing 15, notched to admit an elastic ring and which is in contact with the body 1 through a spherical bearing of center O, a counterseal 3, in contact with the casing 15 through a spherical bearing of center O, a seal 4 functioning by elasticity and by plastic flow, a gland ring 5 for compression of the seal, an elastic ring 6, equipped with a screw 13 and a nut 10, for tightening, while the screw 13 and the nut 10 have a conical bearing, a back-up ring 7 integral with the casing 15.

The device according to this variant is represented in FIG. 15 before tightening, just after introduction of the smooth tubular joint.

To put such a device into service, the screw 13 is worked, which has the effect of tightening the elastic ring 6. In that movement, the elastic ring 6 presses on the back-up ring 7, which is mechanically integrated with the casing 15, fastened in turn on the body 1. Said elastic ring 6 can thus drive back the gland ring 5, which compresses the seal 4 on the counterseal 3 in order to obtain tightness and to be directly tightened on the smooth tubular joint, thus securing the mechanical connection.

With this embodiment, tightness and mechanical connection can be obtained with an angular misalignment α of center O, thanks to the presence of concentric spherical bearings of center O between parts 1 and 15 and then 1 and 3, respectively.

The embodiment of the device according to the invention represented in FIG. 15 makes it possible to obtain a result similar to that obtained by the device according to FIG. 14, with the possibility, into the bargain, of an angular misalignment ax between the axis of the mechanical coupling device and the smooth mechanical joint around a center O.

Both of these embodiments are based on the compression seal technique, accompanied by the use of an elastic ring. The latter at the same time compresses the seal and makes the mechanical connection between the coupling device and the smooth tubular joint.

In such connections, the mechanical joint is integrated with a pipe end.

The technique according to the invention described above thus makes possible the simple and rapid fitting of pipes at their ends and, in particular, the laying of successive lengths of a fluid pipeline for pipe diameters varying within a wide range, for example but not limitatively, between approximately 15 and 500 mm and preferably between approximately 20 and 250 mm.

Its application and use are economical, which makes it possible for that technique to offer a systematic alternative, not only to the three types of prior techniques mentioned above, but also to the weld and screw or flanged coupling techniques which in most cases demand considerable work to order that must be carried out on site.

In general, the invention provides all the advantages which could be partially obtained by any of the three techniques of the prior art mentioned above, namely:

smooth tubular joint coupling, economical fabrication in a single assembly of each fitting and of each mechanism that go into the construction of a fluid circuit and are connected to smooth tubular joints, rapid and economical laying of pipe in repetitive series or made to order, rapid replacement of lengths of pipe; rapid modification of fluid circuits, consequent adaptation to a range of pipe diameters at least up to 400 mm, use of seals made of elastomer or other polymer, composites or graphite, in order to respond to different corrosion and temperature conditions and with possibilities of very different shapes, use in construction of steel or stainless steel or other materials, such as metals, polymers and/or composites.

What is claimed is:

1. A coupler for joining two sections of pipe, comprising at least one coupling unit comprising:
   (a) a body portion having an interior cavity defined by an inner surface of the body portion for receiving an end of a pipe;
   (b) an annular seal, said annular seal being sized to fit against the inner surface of the body portion, and being disposed in the interior cavity of the body portion;
   (c) an annular gland ring, said annular gland ring being sized to fit against the inner surface of the body portion, and being disposed in the interior cavity of the body portion adjacent to the annular seal;
   (d) an annular back-up ring, said annular back-up ring being sized to fit against the inner surface of the body portion, and being disposed in the interior cavity of the body portion adjacent to the annular gland ring on a side opposite the annular seal;
   (e) a split elastic ring having an annular portion and two end portions, said annular portion being sized to fit against the inner surface of the body portion and being disposed in the interior cavity of the body portion such that closing of the split elastic ring by bringing the end portions together results in compression of the gland ring and the back up ring between the split elastic ring and a pipe disposed within the body portion; and
   (f) a screw, engaged with the ends of the split elastic ring, said screw being turnable to open or close the distance between the two ends of the split elastic ring and loosen or tighten the annular portion of the split elastic ring.

2. The coupling assembly of claim 1, wherein the body portion is contiguous with the end of one of the sections of pipe to be joined.

3. The coupling assembly of claim 1, wherein the coupler comprises a plurality of coupling units and the interior cavities of the body portions of the plurality of coupling units are contiguous.

4. The coupler of claim 1, wherein the coupling assembly unit further comprises an annular counterseal, said annular counter seal being sized to fit against the inner surface of the body portion, and being disposed in the interior cavity of the body portion adjacent to the annular seal on a side opposite to the annular gland ring.

5. The coupling assembly of claim 1, wherein a union nut and a gasket are disposed at each end portion of the split elastic ring, and wherein the screw is a symmetrical pitch screw.

6. The coupling assembly of claim 5, wherein the nuts are symmetrical pitch nuts.

7. The coupling assembly of claim 1, wherein the coupling unit further comprises means for providing angular tolerance in the alignment of the pipe sections to be joined.

8. The coupling assembly of claim 7, wherein the means for providing angular tolerance in the alignment of the pipe sections to be joined comprises
   a counter ring disposed in contact with the annular back-up ring along a first spherical surface and
   an annular counterseal, said annular counter seal being sized to fit against the inner surface of the body portion, and being disposed in the interior cavity of the body portion adjacent to the annular seal on a side opposite to the annular gland ring, said annular counterseal being in contact with the interior surface of the body portion along a second spherical surface, wherein the first and second spherical surfaces are centered on a common axis.

9. The coupling assembly of claim 8, wherein the counterseal has an extension portion having an inner surface and an outer surface, the inner surface of the extension portion disposed facing the annular seal, the annular gland ring the split elastic ring and the annular back-up ring and outer surface of the extension portion disposed facing the inner surface of the interior cavity.

10. A method for coupling two sections of pipe comprising the steps of inserting an end of a first section of pipe into a coupler comprising at least one coupling unit comprising:
   (a) a body portion having an interior cavity defined by an inner surface of the body portion for receiving the end of a pipe;
   (b) an annular seal, said annular seal being sized to fit against the inner surface of the body portion, and being disposed in the interior cavity of the body portion;
   (c) an annular gland ring, said annular gland ring being sized to fit against the inner surface of the body portion, and being disposed in the interior cavity of the body portion adjacent to the annular seal;
   (d) an annular back-up ring, said annular back-up ring being sized to fit against the inner surface of the body portion, and being disposed in the interior cavity of the body portion adjacent to the annular gland ring on a side opposite the annular seal;
   (e) a split elastic ring having an annular portion and two end portions, said annular portion being sized to fit against the inner surface of the body portion and being disposed in the interior cavity of the body portion such that closing of the split elastic ring by bringing the end portions together results in compression of the gland ring and the back up ring between the split elastic ring and a pipe disposed within the body portion; and
   (f) a screw, engaged with the end portion of the split elastic ring, said screw being turnable to open or close the distance between the two end portion of the split elastic ring and loosen or tighten the annular portion of the split elastic ring; and
   turning the screw to close the distance between the ends of the split elastic ring to establish a tight mechanical coupling between the coupling and the end of the first section of pipe.

11. The method of claim 10, wherein the body portion of the coupler is contiguous with the end of the second of the sections of pipe to be joined, whereby the turning of the screw couples the two sections of pipe.

12. The method of claim 10, wherein the coupler comprises a plurality of coupling units and the interior cavities of the body portions of the plurality of coupling units are contiguous, and further comprising the step of inserting a second section of pipe into a second coupling unit and turning the screw of the second coupling to close the distance between the end portion of the split elastic ring of the second coupling unit to establish a tight mechanical coupling between the second coupling unit and the end of the second section of pipe.

13. The method of claim 10, wherein the coupling unit further comprises an annular counterseal, said annular counter seal being sized to fit against the inner surface of the body portion, and being disposed in the interior cavity of the body portion adjacent to the annular seal on a side opposite to the annular gland ring.

14. The method of claim 10, wherein a union nut and a gasket are disposed at each end portion of the split elastic ring, and wherein the screw is a symmetrical pitch screw.

15. The method of claim 14, wherein the nuts are symmetrical pitch nuts.

16. The method of claim 10, wherein the coupling unit further comprises means for providing angular tolerance in the alignment of the pipe sections to be joined.

17. The method of claim 16, wherein the means for providing angular tolerance in the alignment of the pipe sections to be joined comprises a counter ring disposed in contact with the annular back-up ring along a first spherical surface and an annular counterseal, said annular counter seal being sized to fit against the inner surface of the body portion, and being disposed in the interior cavity of the body portion adjacent to the annular seal on a side opposite to the annular gland ring, said annular counterseal being in contact with the interior surface of the body portion along a second spherical surface, wherein the first and second spherical surfaces are centered on a common axis.

18. The method of claim 17, wherein the counterseal has an extension portion having an inner surface and an outer surface, the inner surface of the extension portion disposed facing the annular seal, the annular gland ring, the split elastic ring and the annular back-up ring and outer surface of the extension portion disposed facing the inner surface of the interior cavity.

* * * * *